(12) United States Patent
Ziemer et al.

(10) Patent No.: US 9,404,574 B2
(45) Date of Patent: Aug. 2, 2016

(54) TRANSMISSION DEVICE AND METHOD FOR OPERATING A TRANSMISSION DEVICE

(75) Inventors: Peter Ziemer, Tettnang (DE); Thilo Schmidt, Meckenbeuren (DE); Georg Gierer, Kressbronn (DE); Gert Bauknecht, Friedrichshafen (DE); Thomas Lindner, Kressbronn (DE); Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 896 days.

(21) Appl. No.: 13/320,921

(22) PCT Filed: Oct. 6, 2010

(86) PCT No.: PCT/EP2010/064933
§ 371 (c)(1),
(2), (4) Date: Nov. 17, 2011

(87) PCT Pub. No.: WO2011/042470
PCT Pub. Date: Apr. 14, 2011

(65) Prior Publication Data
US 2012/0186376 A1 Jul. 26, 2012

(30) Foreign Application Priority Data

Oct. 9, 2009 (DE) .......................... 10 2009 045 508

(51) Int. Cl.
*F16H 59/00* (2006.01)
*F16H 63/30* (2006.01)
*F16H 57/08* (2006.01)

(52) U.S. Cl.
CPC ...... *F16H 63/3026* (2013.01); *F16H 2057/087* (2013.01); *F16H 2200/2094* (2013.01); *Y10T 74/19251* (2015.01)

(58) Field of Classification Search
CPC .................. F16H 63/3026; F16H 2057/087
USPC .......... 475/116, 120, 121, 127, 284; 477/143, 477/70, 79, 84, 86, 168, 169, 180; 74/335
See application file for complete search history.

(56) References Cited

U.S. PATENT DOCUMENTS

| 3,279,573 A | 10/1966 | Hensel |
| 5,865,289 A * | 2/1999 | Ishimaru .................. 192/48.611 |

(Continued)

FOREIGN PATENT DOCUMENTS

| DE | 197 00 635 A1 | 8/1997 |
| DE | 197 42 644 A1 | 4/1999 |
| DE | 10 2008 048 634 A1 | 4/2009 |

*Primary Examiner* — William Kelleher
*Assistant Examiner* — Zakaria Elahmadi
(74) *Attorney, Agent, or Firm* — Michael J. Bujold; Davis & Bujold, PLLC (57) ABSTRACT

A transmission device has at least one electro-hydraulic transmission control unit and a method of operating the transmission device having a plurality of gear wheel that can be engaged and disengaged from a force flow by fluidically actuated shifting elements. A piston space of a first shifting element, delimited by a second functional surface of the actuating piston of the first shifting element, is made separate from a piston space of a second shifting element, delimited by the first functional surface of the actuating piston, and an area of the second shifting element, that carries an actuating pressure, or an area of the first shifting element, that carries an actuating pressure, is, or can be, connected to the piston space delimited by the second functional surface of the actuating piston of the first shifting element.

8 Claims, 10 Drawing Sheets

(56) References Cited

U.S. PATENT DOCUMENTS

| | | | | |
|---|---|---|---|---|
| 5,950,787 | A * | 9/1999 | Murasugi et al. | 192/85.25 |
| 6,364,811 | B1 * | 4/2002 | Hubbard et al. | 477/143 |
| 6,591,958 | B1 * | 7/2003 | Moorman | 192/85.63 |
| 6,599,215 | B2 * | 7/2003 | Takatori et al. | 475/70 |
| 6,723,021 | B2 * | 4/2004 | Claus et al. | 477/68 |
| 8,858,387 | B2 * | 10/2014 | Haupt et al. | 475/282 |
| 2002/0069716 | A1 * | 6/2002 | Sporl | 74/335 |
| 2005/0026735 | A1 * | 2/2005 | Tiesler et al. | 475/269 |
| 2005/0202927 | A1 * | 9/2005 | Ziemer et al. | 475/331 |
| 2007/0105692 | A1 * | 5/2007 | Dourra et al. | 477/156 |
| 2007/0129201 | A1 * | 6/2007 | Rihn et al. | 475/269 |
| 2007/0275812 | A1 * | 11/2007 | Tiesler et al. | 475/275 |
| 2007/0293363 | A1 * | 12/2007 | Bauknecht et al. | 475/276 |
| 2008/0015077 | A1 * | 1/2008 | Kamm et al. | 475/269 |
| 2008/0234093 | A1 * | 9/2008 | Diosi et al. | 475/276 |
| 2008/0287258 | A1 * | 11/2008 | Moriya et al. | 477/156 |
| 2008/0300106 | A1 * | 12/2008 | Shibata et al. | 477/156 |
| 2008/0305911 | A1 * | 12/2008 | Moorman et al. | 475/269 |
| 2009/0088296 | A1 * | 4/2009 | Long et al. | 477/156 |
| 2009/0176612 | A1 * | 7/2009 | Popp et al. | 475/116 |
| 2009/0203479 | A1 * | 8/2009 | Krause et al. | 475/59 |
| 2009/0203481 | A1 * | 8/2009 | Nohara et al. | 475/150 |
| 2010/0029439 | A1 * | 2/2010 | Hayashi | 477/156 |
| 2010/0311542 | A1 * | 12/2010 | Long | 477/156 |

* cited by examiner

Fig. 1

| | A | B | C | D | E | F | SA | SE |
|---|---|---|---|---|---|---|---|---|
| "1" | o | | | o | | o | 1.83 | – |
| "2" | o | | o | | | o | 1.83 | – |
| "3" | o | o | | | | o | 1.19 | – |
| "4" | o | | | | o | o | 0.44 | 0.76 |
| "5" | o | o | | | o | | 0.20 | 1.00 |
| "6" | | o | | | o | o | – | 1.20 |
| "7" | | | o | | o | o | – | 1.00 |
| "R" | | o | | o | | o | – | – |

| | C | D | B | E | F | A | SA | SE |
|---|---|---|---|---|---|---|---|---|
| "1" | | o | | | o | o | 1.00 | — |
| "2" | o | | | | o | o | 1.00 | — |
| "3" | | | o | | o | o | 0.67 | — |
| "4" | | | | o | o | (o) | 0.00 | 1.00 |
| "5" | | | o | o | | o | 0.48 | 1.73 |
| "6" | o | | | o | | o | 0.39 | 1.39 |
| "7" | | o | | o | | o | 0.20 | 1.20 |
| "8" | o | o | | o | | | — | 1.00 |
| "9" | | o | o | o | | | — | 0.83 |
| "R" | | o | o | | o | | — | — |

TRANSMISSION DEVICE AND METHOD FOR OPERATING A TRANSMISSION DEVICE

This application is a National Stage completion of PCT/EP2010/064933 filed Oct. 6, 2010, which claims priority from German patent application serial no. 10 2009 045 508.6 filed Oct. 9, 2009.

FIELD OF THE INVENTION

The invention concerns a transmission device and a method for operating a transmission device.

BACKGROUND OF THE INVENTION

Transmission devices or automatic variable-speed transmissions known from practice are usually built with hydraulically actuated frictional shifting elements for obtaining various gear ratios. To be able to operate such transmission devices with an efficiency as great as possible, particular frictional shifting elements are also replaced by claw shifting elements which, compared with frictional shifting elements, are characterized by lower drag torques. During the operation of a transmission device the actuating pistons of the frictional shifting elements or claw shifting elements are preferably actuated hydraulically on one side in the closing direction and acted upon by a restoring spring mechanism in the opening direction with a spring force, so that when the actuating pressure is low enough they are shifted out of a force flow of the transmission device and changed to an open operating condition.

Moreover, from practice shifting elements are also known, which in the area of their actuating pistons are acted upon by hydraulic actuating pressures in both the closing direction and the opening direction, and then a restoring spring mechanism that acts in the direction of a shifting element is no longer necessarily needed. Depending on the application concerned, where appropriate restoring spring mechanisms with small spring constants can be provided for holding the actuating piston in the starting position equivalent to an open operating state of the shifting element.

As is known, the additional hydraulic restoration of such shifting elements requires in each case an actuating piston or double-piston in the form of a differential piston. Here, a first functional surface of the actuating piston, on which the actuating pressure that acts in the closing direction of the shifting element is applied, is larger than a second functional surface of the actuating piston on which an actuating pressure that acts in the opening direction of the shifting element can be applied. If such a differential piston is acted upon simultaneously in the area of the first functional surface and in the area of the second functional surface by equal pressures, then by comparison with one-sided pressurization of the actuating piston a lower piston force level is produced.

The above-described piston force level can be appropriately adjusted to improve the quality of shift operations in which a support element in the area of the shifting element is substantially smaller than in at least one other shift operation by means of which a gear ratio in a transmission device with a considerably larger support element is to be engaged. This means that at least one gear ratio with a high support element in the area of the shifting element is produced by an actuating pressure in the area of the second functional surface of the actuating piston, which is essentially equal to zero. Gear ratios from which smaller support elements at the shifting element result, are obtained with an actuating pressure applied in the area of the second functional surface.

Disadvantageously, for the hydraulic restoration of an actuating piston of a shifting element in each case an additional pressure oil supply has to be provided, and this entails undesirably high design complexity and cost, particularly in the case of shifting elements in the form of clutches. Furthermore, an electro-hydraulic transmission control system for providing the actuating pressure that must be applied to the second functional surface of the actuating piston has to be designed and built with additional control elements such as valve mechanisms and the like, whereby in turn the units takes up more structural space and the manufacturing costs of the transmission device are increased.

From DE 197 00 635 C2 a clutch arrangement for an automatic transmission is known, in which an actuating piston of a frictional shifting element can be acted upon in the area of a first functional surface with an actuating pressure acting in the closing direction of the shifting element. In the area of a second functional surface, the actuating piston of the shifting element can be acted upon by an actuating pressure of a second, also frictional shifting element, such that a piston space of the further shifting element, in the area of which the further shifting element can be acted upon by the actuating pressure that acts in the closing direction of the further shifting element, is delimited by the actuating piston of the shifting element and the actuating piston of the further shifting element.

In the clutch arrangement an above-described hydraulic restoration of a shifting element by acting upon the actuating piston of the shifting element in the area of its second functional surface, i.e. in the opening direction of the shifting element, or the production of a reduced piston force level acting on the actuating piston of the shifting element, can only be accomplished with substantial control and regulation complexity.

SUMMARY OF THE INVENTION

Accordingly, the purpose of the present invention is to provide a transmission device and a method for operating a transmission device, by means of which a desired shifting quality can be ensured by simple, inexpensive and space-saving means.

The transmission device according to the invention comprises at least one electro-hydraulic transmission control unit and a plurality of gear wheel pairs than can be engaged in and disengaged from a force flow by means of hydraulically actuated shifting elements, such that various gear ratios can be obtained by means of the gear wheel pairs. The shifting elements can in each case be acted upon in the area of a first functional surface of an actuating piston by the fluidic actuation pressure which acts in the closing direction of the shifting element. At least a first shifting element and a second shifting element are functionally connected, in such manner that at least an actuating piston of the first shifting element can be acted upon, as a function of an actuating pressure of the second shifting element, by a hydraulic pressure in the area of a second functional surface which acts in the opening direction of the first shifting element.

According to the invention, a piston space of the first shifting element delimited by the second functional surface of the actuating piston of the first shifting element is made separate from a piston space of the second shifting element delimited by the first functional surface of the actuating piston, and an area of the second shifting element that carries the actuating pressure, or an area of the first shifting element that carries the actuating pressure, is or can be connected to the piston space delimited by the second functional surface of the actuating piston of the first shifting element.

In the transmission device according to the invention, the fluidic, i.e. preferably hydraulic actuation of the second shifting element is used for restoring the actuating piston of the first shifting element, wherein in comparison with transmission devices known from practice, in which an actuating piston of a shifting element is acted upon in the opening direction of the shifting element by a restoring spring mechanism, the structural complexity in the transmission device and also in the area of the electro-hydraulic transmission control system is only very slightly increased. Compared with transmission devices known from practice in which an actuating piston of a shifting element can be acted upon with a hydraulic actuating pressure in both the opening and the closing direction, the transmission device according to the invention is characterized by substantially less structural complexity since, particularly in the area of the electro-hydraulic transmission control unit, no additional components are required for acting upon the actuating piston with a fluidic actuating pressure in the area of the second functional surface. Moreover, in the transmission device according to the invention no further pressure oil supply has to be provided, so the structural complexity and cost are reduced compared with solutions known from prior practice.

In an advantageous further development of the transmission device according to the invention, the first shifting element is made with a spring mechanism that acts upon the actuating piston in the opening direction of the shifting element, so that even if the fluidic supply should fail, the first shifting element is moved to its fully open operating condition and a preferred position is defined in a simply designed manner.

In a further advantageous embodiment of the transmission device according to the invention, to obtain a first gear ratio during which the actuating pressure of the second shifting element is essentially approximately zero and a support element is higher than during the obtaining of a second gear ratio at which the actuating pressure of the second shifting element corresponds to a closing pressure level of the second shifting element, in the area of its second functional surface the actuating piston of the first shifting element is acted upon by an actuating pressure which is at least approximately zero.

Thus it is ensured in a simple manner that the first shifting element has the necessary transmission capacity for obtaining the gear ratio with the higher support element, and while obtaining the gear ratio during which there is a smaller support element at the first shifting element, the actuating force of the first shifting element in the closing direction is reduced, and during shifting operations in which the first shifting element is involved, the shifting quality is compromised to a lesser extent by fluctuations of the actuating pressure of the first shifting element.

In a further advantageous embodiment of the transmission device according to the invention, the first functional surface of the actuating piston of the first shifting element is larger than the second functional surface of the actuating piston of the first shifting element, and an actuating-pressure-carrying area of the first shifting element can be brought into functional connection with a piston space delimited by the second functional surface of the actuating piston of the first shifting element by means of a valve device that can be actuated as a function of the actuating pressure of the second shifting element. Thus, the actuating piston of the first shifting element can be acted upon by the actuating pressure of the first shifting element both in the area of its first functional surface and in the area of its second functional surface, in such manner that the actuating pressure is applied on the second functional surface of the actuating piston of the first shifting element as a function of the actuating pressure of the second shifting element, and thus in turn, while obtaining the gear ratio with the high support element the desired high piston force level is applied in the area of the actuating piston of the first shifting element, and while obtaining the gear ratio with the lower support element, the lower piston force level desired for a high shifting quality is applied at the actuating piston of the first shifting element.

In an embodiment of the transmission device according to the invention that is inexpensive and simply designed and that can be operated with little control and regulation effort, the valve device is in the form of a change-over valve that can be reversed as a function of the actuating pressure of the second shifting element, with a differential piston to which the actuating pressure of the first shifting element and the actuating pressure of the second shifting element can be applied.

In a further advantageous embodiment of the transmission device according to the invention, the actuating piston of the first shifting element is arranged to move longitudinally along a shaft and, by means of at least one carrier element that passes through the shaft, is in functional connection with a differential piston arranged to move longitudinally in the shaft, which can be acted upon in the area of a functional surface by the actuating pressure of the first shifting element that acts on the differential piston in the closing direction of the first shifting element and in the area of another functional surface by the actuating pressure of the second shifting element that acts on the differential piston in the opening direction of the first shifting element, whereby, again as a function of the actuating pressure of the second shifting element, various piston force levels can be produced on the actuating piston of the first shifting element.

The first shifting element can be in the form of an interlocking, or a frictional shifting element.

In the method according to the invention for operating a transmission with a plurality of shifting elements for obtaining various gear ratios with various support elements, in order to obtain at least two gear ratios with support elements of different size at least one of the shifting elements is in each case engaged in and/or disengaged from a force flow.

According to the invention, to obtain the gear ratio during which there is a higher support element in the area of the shifting element, an actuating piston of the shifting element is acted upon in the area of a first functional surface with an actuating force in the closing direction of the shifting element, and to obtain the gear ratio during which there is a lower support element in the area of the shifting element, the piston is additionally acted upon in the area of a second functional surface with an actuating force in the opening direction of the shifting element, such that the actuating force in the opening direction of the shifting element is applied on the second functional surface of the actuating piston of the shifting element as a function of an actuating force of another shifting element which acts in the closing direction thereof.

By using the method according to the invention, the quality of shifting operations in which the shifting element is involved and during which support elements of different size act in the area of the shifting element, is improved in a simple manner in that, in the area of the shifting element or in the area of its actuating piston, different piston force levels are applied as a function of the support elements existing in each case, and particularly when the lower piston force level is applied, changes of the actuating pressure that acts in the closing direction of the shifting element and also changes of the actuating pressure that acts in the opening direction of the shifting element have, in each case, a smaller effect on the shifting quality.

Other advantages and advantageous embodiments of the object of the invention emerge from the claims and from the example embodiments described below with reference to the drawings wherein, for the sake of clarity, in the description of the various example embodiments, the same indexes are used for components with the same structure and function.

The features indicated in the example embodiments of the transmission device according to the invention described below and the proposed operating methods, are in each case, whether taken in isolation or in any desired combination with one another, suitable for developing further the object according to the invention. In relation to developing further the object according to the invention, the combinations of features do not imply any limitation, but are essentially only presented as examples.

DETAILED DESCRIPTION OF THE PREFERRED EMBODIMENTS

Figure 1:
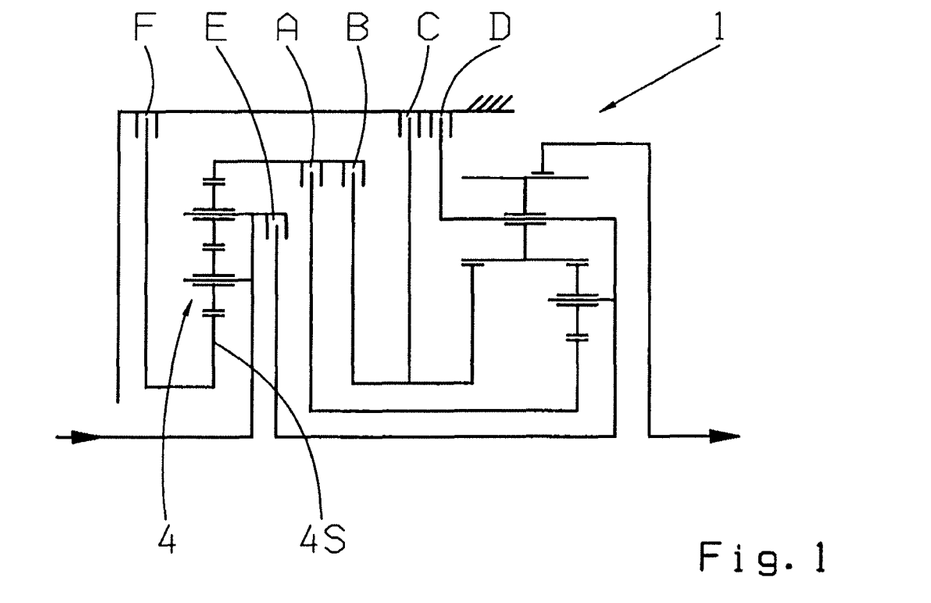
FIG. 1: A gear wheel layout of a first example embodiment of a transmission device.

FIG. 1 shows a gear wheel layout of a first example of a transmission device 1 according to the invention, designed as a seven-gear automatic variable-speed transmission based on a so-termed Lepelletier gearset having a plurality of frictional shifting elements A to F. A sun gear 4S of a planetary gearset 4 on the transmission input side can be held fixed by a shifting element F in this case in the form of a starting brake.

Figure 2:
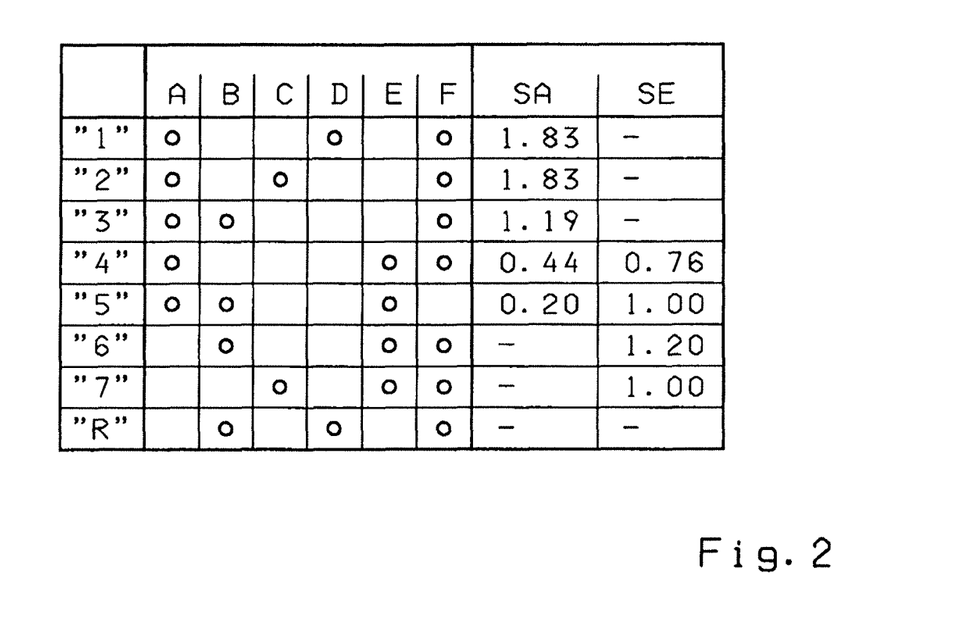
FIG. 2: A shifting scheme for the gear wheel layout represented in FIG. 1.

As a function of actuating the shifting elements A to F by the transmission control system, seven gear ratios "1" to "7" for forward driving and one gear ratio "R" for reversing can be obtained, as shown in detail in FIG. 2.

In the eighth and ninth columns of the shifting scheme in FIG. 2 are entered, respectively, the support (factors) elements SA and SE that exist in the area of the shifting element A in gear ratios "1" to "5" and in the area of the shifting element E in gear ratios "4" to "7", the support (factor) element SA of the shifting element A being 1.83 in the first gear ratio "1" and being equal to 0.44 while the fourth gear ratio "4" is engaged.

Figure 3:
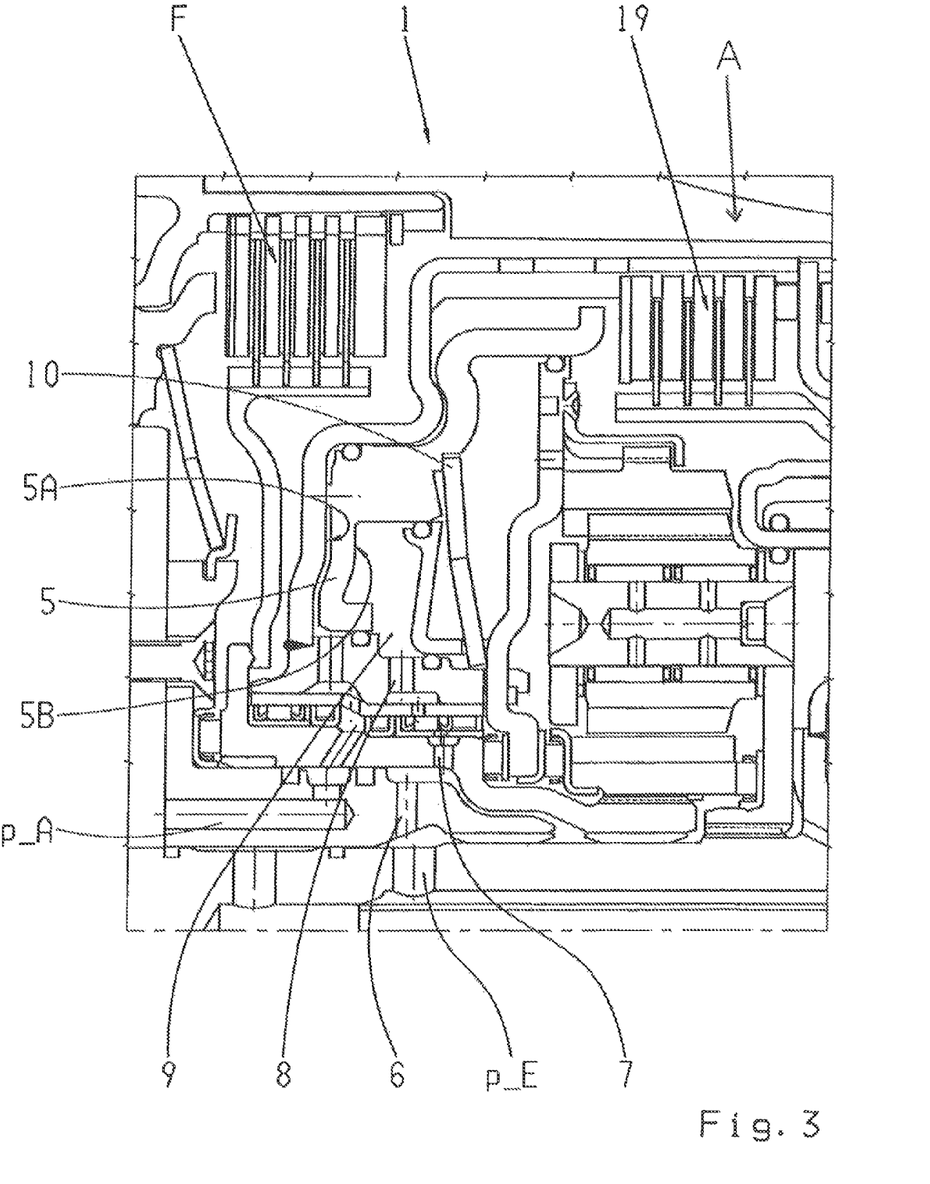
FIG. 3: A schematic, partially sectioned view of the transmission device in FIG. 1, in the area of a first frictional shifting element.

FIG. 3 shows a partially sectioned view of the transmission device 1 of FIG. 1 in the area of the frictional shifting element A, which is made with an actuating piston 5. The actuating piston 5 can be acted upon the area of the first functional surface 5A, from an area that carries an actuating pressure p_A, by the actuating pressure p_A acting in the closing direction of the shifting element A. In the area of a second functional surface 5B the actuating piston 5 of the shifting element A can be acted upon by an actuating pressure p_E of the shifting element E, which is applied to the actuating piston 5 in the opening direction of the shifting element A.

This means that while the fourth gear ratio step "4" is engaged and while obtaining the fifth gear ratio step "5", the actuating piston 5 of the shifting element A is acted upon in the area of its first functional surface 5A by the actuating pressure p_A and in the area of its second functional surface 5B by the actuating pressure p_E of the shifting element E, whereas while in the first three gear ratio steps "1" to "3" for forward driving, the actuating piston 5 of the shifting element A is acted upon by the actuating pressure p_A of the shifting element A only in the area of its first functional surface 5A, and on the actuating piston 5 the piston force level in the closing direction of the shifting element A is higher than it is in the fourth and fifth gear ratio steps "4" and "5".

This procedure ensures that in the gear ratio steps "1" to "3", each characterized by a higher support (factor) element SA in the area of the shifting element A than are the fourth and fifth gear ratio steps "4" and "5", the shifting element A has the transmission capacity required for obtaining the gear ratio steps "1" to "3".

When in the fourth gear ratio step "4" and the fifth gear ratio step "5", the support (factors) elements SA in the area of the shifting element A are substantially smaller, and owing to the additional action upon the actuating piston 5 in the area of its second functional surface 5B by the actuating pressure p_E of the shifting element E, the actuating piston 5 is acted upon by a lower piston force level in the closing direction of the shifting element A.

The area of the transmission device 1 in FIG. 3 that carries the actuating pressure p_E is in this case connected by bores 6, 7 and 8 to a piston space 9 of the shifting element A delimited by the second functional surface 5B.

In the present case the first functional surface 5A of the actuating piston 5 of the shifting element A is larger than its second functional surface 5B, so that if the actuating pressures p_A and p_E of the shifting elements A and E are equal, the actuating pressure p_E of the shifting element E acting on the second functional surface 5B does not open the shifting element A. Even when in the fourth and fifth gear ratio steps "4" and "5" the shifting element A is not changed to its open operating condition by the restoring spring mechanism 10 acting on the actuating piston 5.

Figure 4:
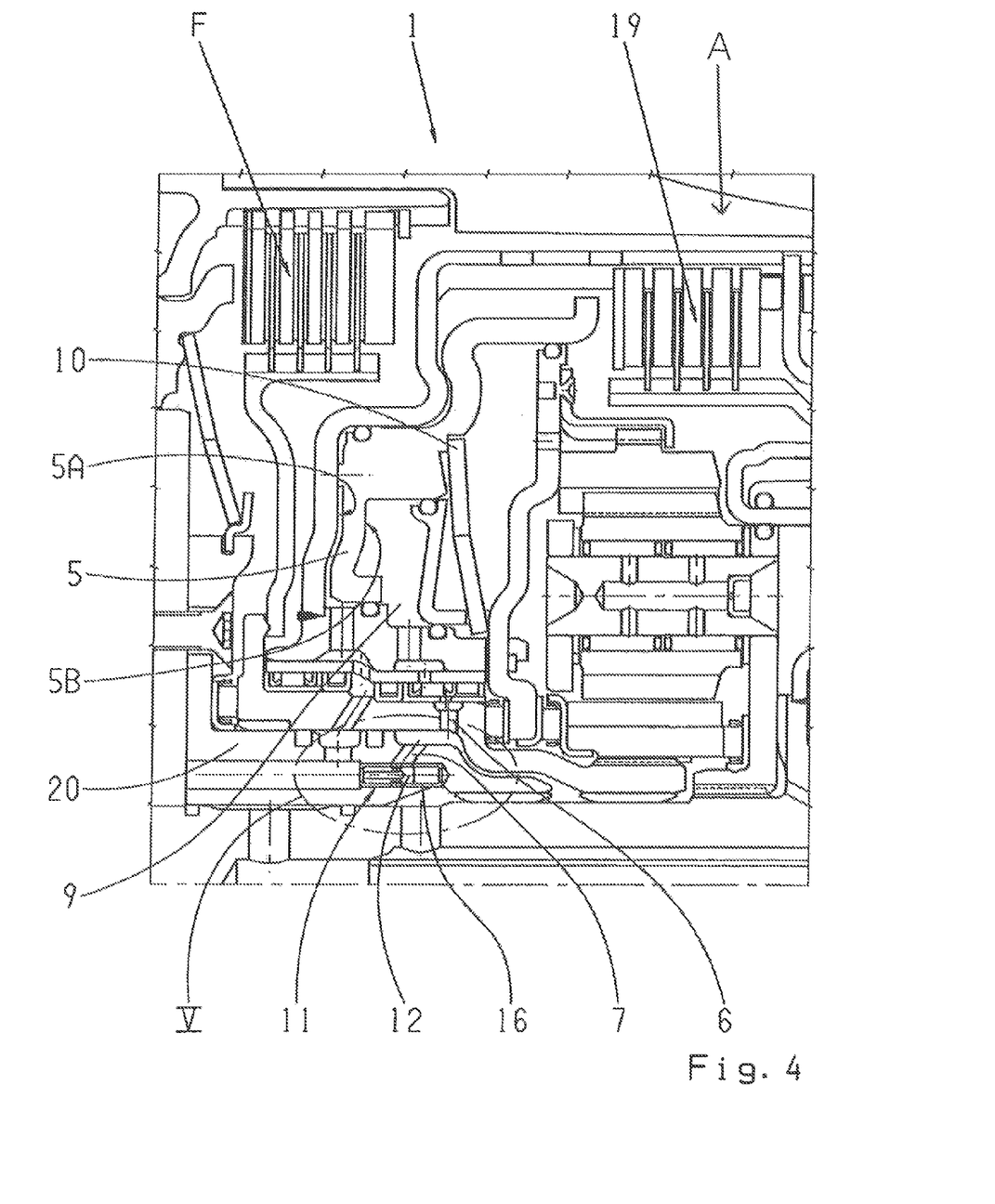
FIG. 4: A representation corresponding to FIG. 3, of an alternative embodiment of the transmission device shown in FIG. 1.

FIG. 4 shows a representation corresponding to FIG. 3, of a second example embodiment of the transmission device 1 of FIG. 1, in which is provided a valve device 11 designed as a change-over valve by means of which, when in the fourth gear ratio step "4" and the fifth gear ratio step "5", the area of the transmission device 1 that contains the actuating pressure p_A can be brought into functional connection with the piston space 9 of the shifting element A, depending on the actuating pressure p_E of the shifting element E, in the manner described below.

Figure 5:
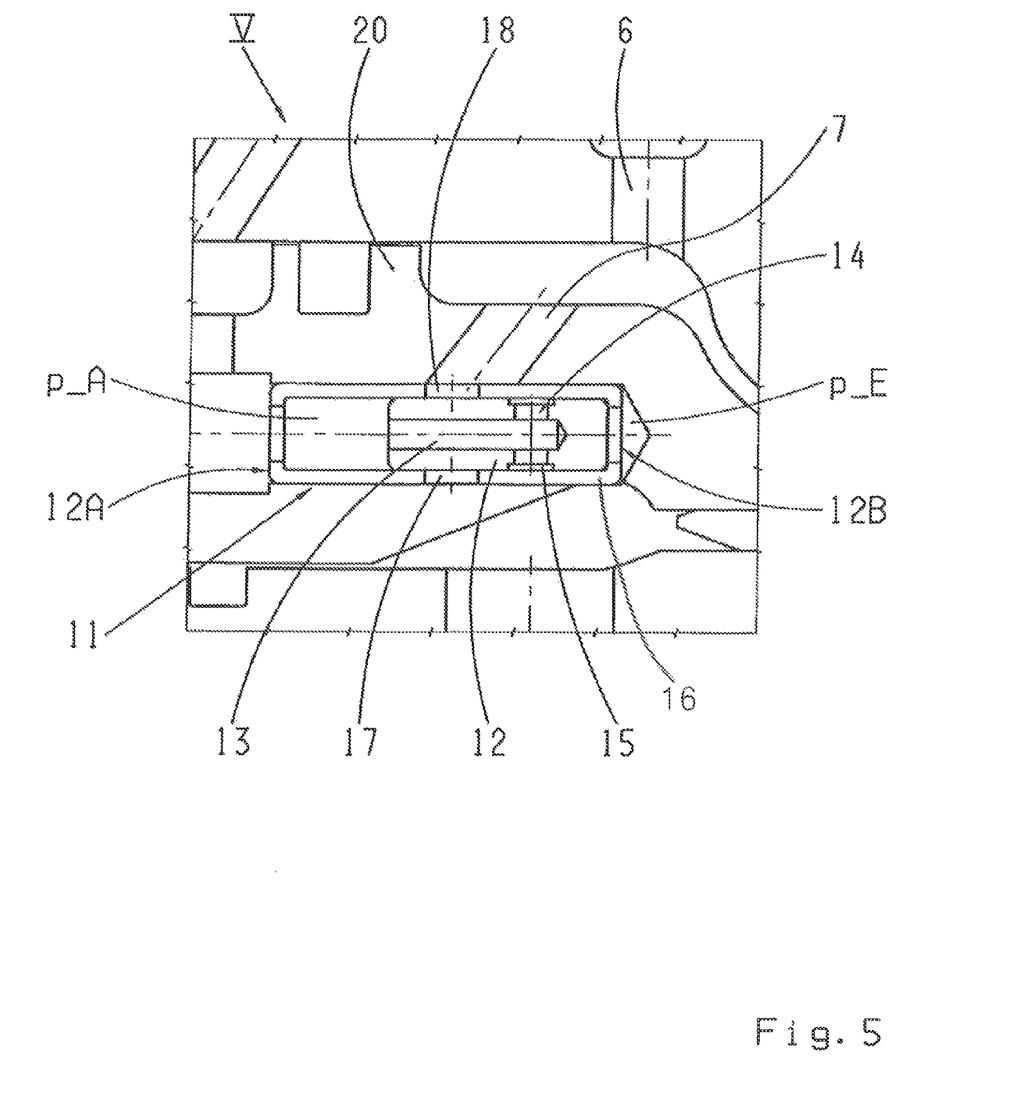
FIG. 5: An enlarged detailed view of an area marked V in FIG. 4.

FIG. 5 shows an enlarged view of an area marked V in FIG. 4, which contains the valve device 11. The valve device 11 is formed with a piston element 12, on one face 12A of which the actuating pressure p_A of the shifting element A is applied and whose opposite face 12B is acted upon by the actuating pressure p_E. In the example embodiment of the valve device 11 shown in FIG. 5 the faces 12A and 12B are of equal size. As a function of the overall force component resulting from the actuating pressures p_A and p_E and acting upon the piston element, the piston element 12 is moved away from the position shown in FIG. 5, where the area carrying the actuating pressure p_A is cut off from the piston space 9 of the shifting element A, to a second switching position in which the area of the transmission device 1 carrying the actuating pressure p_A is connected to the piston space 9 of the shifting element A.

For this, the piston element 12 is made with a blind-hole bore 13 that extends in the axial direction, which in its end area is connected with transverse bores 14, 15 that pass through the wall of the piston element 12. In the present case the piston element 12 is pre-fitted into a sleeve 16 in turn provided with transverse bores 17, 18. Together with the piston element 12, the sleeve 16 is pressed into a component 20 of the transmission device 1 in this case constituting a hub. In the second switching position of the piston element 12 shown in FIG. 4, the transverse bores 14 and 15 are aligned with the transverse bores 17 and 18 of the sleeve 16, whereby the area of the transmission device 1 carrying the actuating pressure p_A is connected to a piston space 9 while in the fourth or fifth gear ratio steps "4" or "5".

Since the first functional surface 5A is larger than the second functional surface 5B of the actuating piston 5 of the shifting element A, when the shifting element E is engaged the actuating piston 5 is acted upon in the area of its second functional surface 5B by the actuating pressure p_E of the shifting element E, so that in the fourth or fifth gear ratio steps "4" and "5", compared to a condition in which the shifting element E is disengaged and there are lower support (factors) elements in the area of the shifting element A, the force acting on a disk packet 19 of the shifting element A is reduced.

The pressure oil supply starting from the area of the transmission device 1 that carries the actuating pressure p_A to the piston chamber 9, is interrupted again in the area of the valve device 11 when the shifting element E is disengaged by reducing the actuating pressure p_E.

Besides the above-described reduction of the actuating force of the shifting element A acting on the actuating piston 5, it is also possible to disengage the shifting element A by acting upon the actuating piston 5 in the area of its second functional surface 5B with the actuating pressure p_E of the shifting element E, this being made possible by reducing the actuating pressure p_A on the larger piston surface, namely in the area of the first functional surface 5A of the actuating piston 5.

Figure 6:
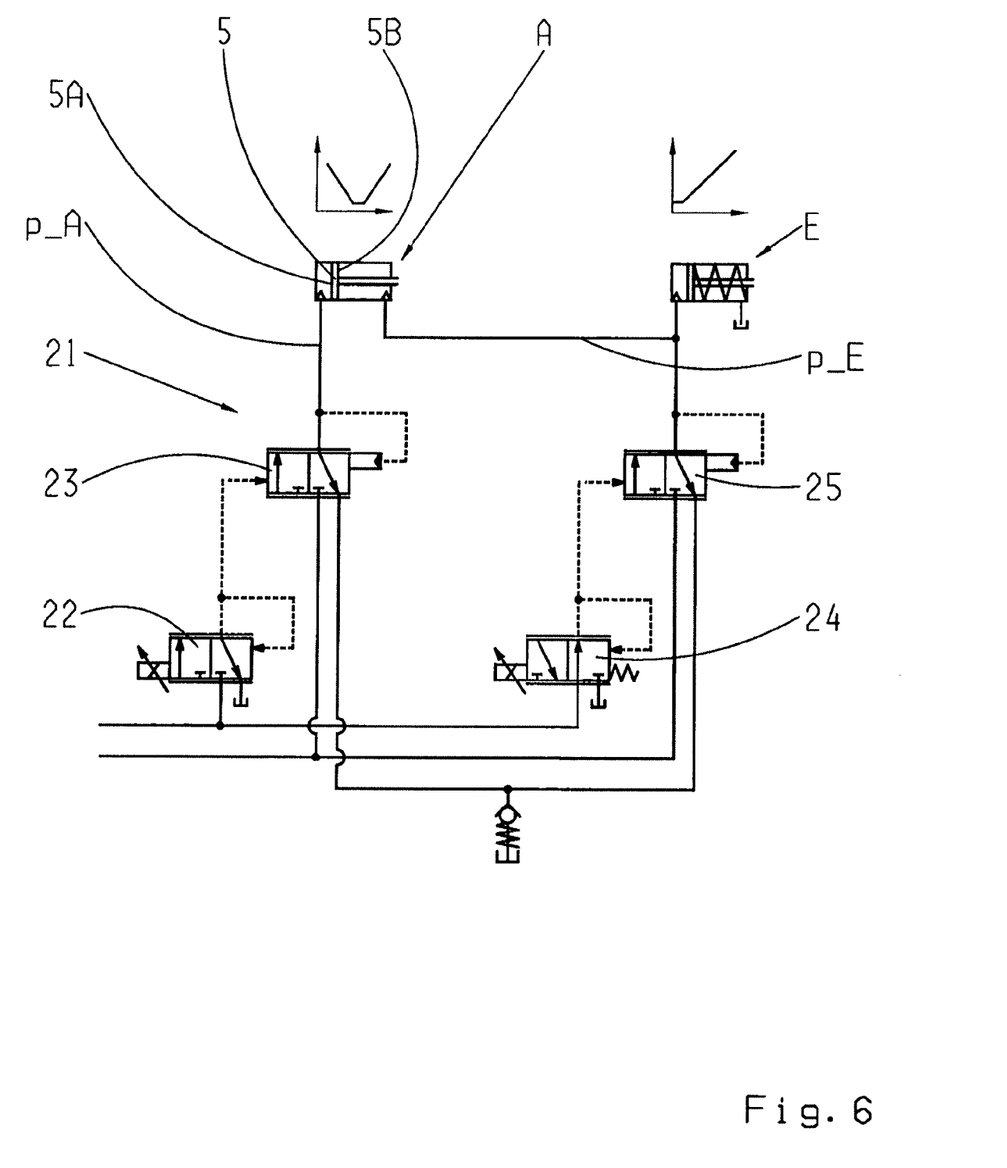
FIG. 6: A partial view of a block circuit diagram of an electro-hydraulic transmission control unit of the transmission device shown in FIG. 1.

FIG. 6 shows part of a block circuit diagram of an electro-hydraulic transmission control unit 21 of the transmission device 1 of FIG. 1, in which the actuating pressure p_A of the shifting element A is controlled by means of valve devices 22 and 23 associated therewith, whereas the actuating pressure acting in the piston space 9 of the shifting element A corresponds to the actuating pressure p_E of the shifting element E, which in turn is controlled by the valve devices 24, 25 associated with the shifting element E.

By means of the electro-hydraulic transmission control unit 21, the shifting elements A and E are actuated in such manner that during emergency running operation the actuating pressure of the shifting element A falls essentially to zero, while the actuating pressure p_E of the shifting element E increases to the maximum system pressure of the transmission device 1. This procedure ensures that during emergency operation of the transmission device 1, the shifting elements A and E are not engaged at the same time.

Figure 7:
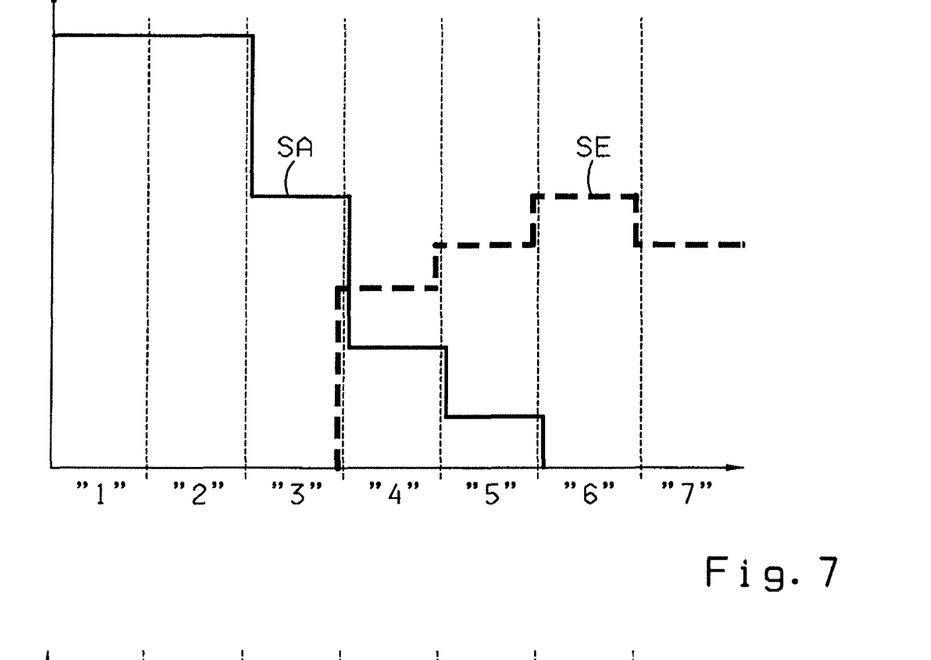
FIG. 7: Two variations of gear- and clutch-dependent support elements in the area of two shifting elements whose piston actuations act in alternation.
Figure 8:
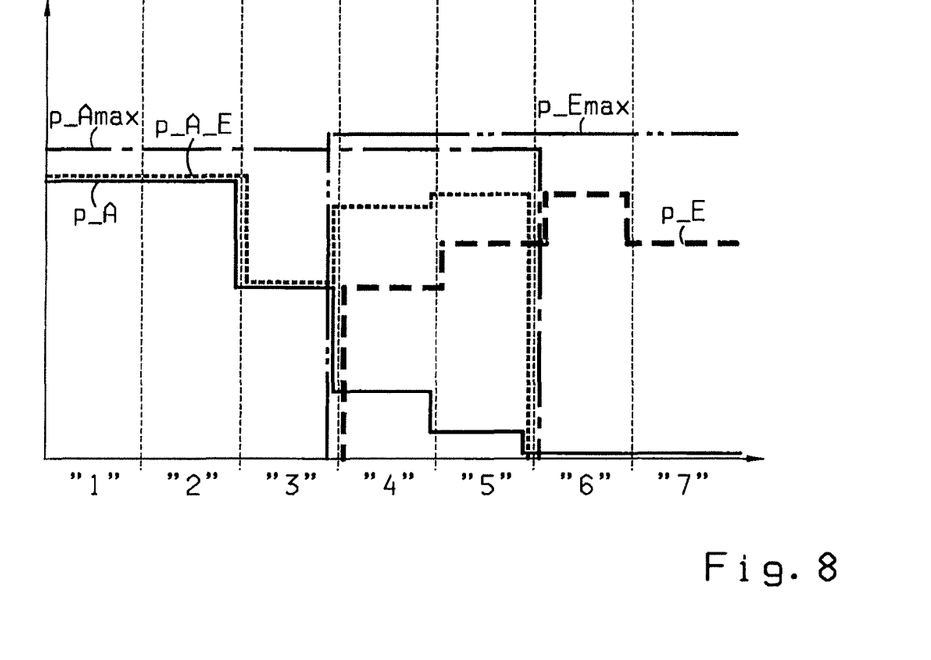
FIG. 8: A number of variations of actuating pressures of shifting elements whose piston actuations act in alternation.

The variations of the support (factors), elements SA and SE of the shifting elements A and E, over the gear ratio steps "1" to "7" for forward driving, are shown in FIG. 7, while FIG. 8 shows the respective corresponding, gear-dependent actuating pressures p_A and p_E of the shifting elements A and E. In FIG. 8 the variation of the actuating pressure p_A of the shifting element A, which has to be adjusted for the shifting element A to have its full transmission capacity, is represented graphically by a continuous line, whereas the actuating pressure p_E that has to be adjusted for the shifting element E to have its full transmission capacity, is represented graphically by a broken line.

The respective maximum obtainable actuating pressures p_Amax and p_Emax of the shifting elements A and E are graphically represented, respectively, by the dash-single-dot line and by the dash-double-dot line in FIG. 8. In addition a variation of the pressure p_A_E required in order to obtain the full transmission capacity of the shifting element A is represented graphically by a dotted line, this pressure having to be applied to the actuating piston 5 in the area of its first functional surface 5A if the functional surfaces 5A and 5B of the actuating piston 5 are of equal size and the actuating piston 5 is acted upon in the area of the second functional surface 5B by the actuating pressure p_E of the shifting element E, the variation p_A_E corresponding to the sum of the pressure variations of the actuating pressures p_A and p_E in the gear ratio steps "1" to "5".

Figure 9:
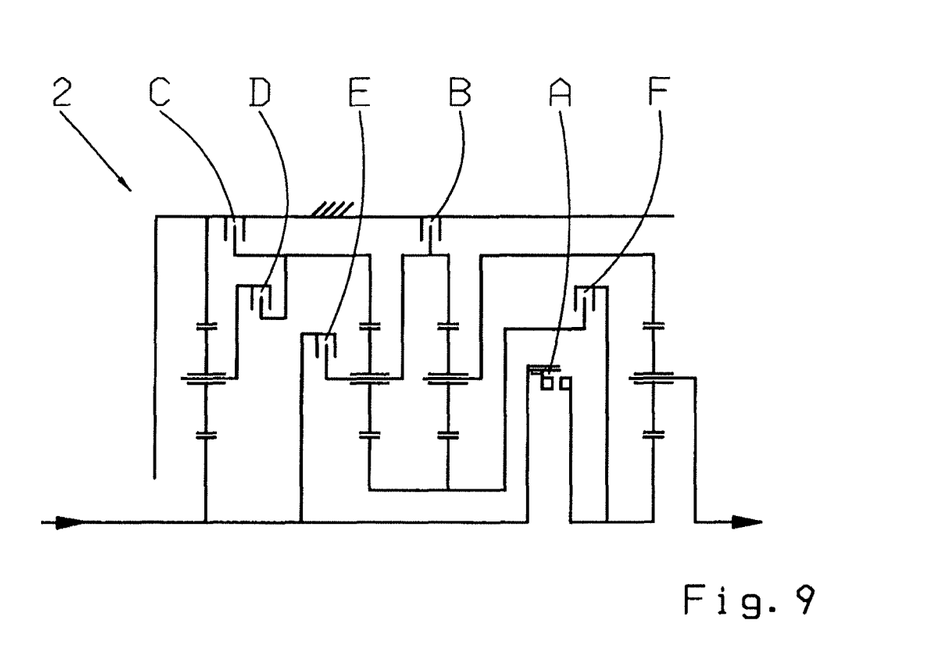
FIG. 9: A gear wheel layout of a second example embodiment of the transmission device according to the invention.
Figure 10:
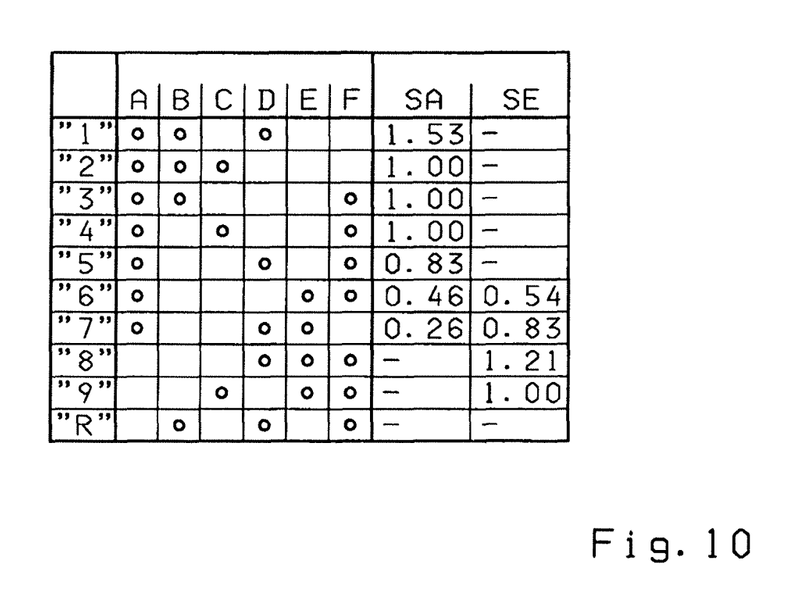
FIG. 10: A shifting scheme for the transmission device in FIG. 9.

FIG. 9 shows as an example a gear wheel layout of a nine-gear automatic variable-speed transmission device 2 according to the invention, in which the shifting element A is an interlocking shifting element. In accordance with the shifting logic scheme shown in detail in FIG. 10, nine gear ratio steps "1" to "9" for forward driving and one gear ratio step "R" for reversing can be obtained. To obtain the first seven gear ratio steps "1" to "7" in each case the claw shifting element or shifting element A is engaged, and to obtain the sixth gear ratio step "6" and the seventh gear ratio step "7" the shifting element E, which is a frictional shifting element, is at the same time engaged in the force flow of the transmission device 2. In the sixth and seventh gear ratio steps "6" and "7" the support (factor) element SA in the area of the shifting element A is considerably smaller than when gear ratio steps "1" to "5" are engaged. From the shifting logic shown it can be seen that the control means explained for the first example embodiment can analogously be used also for the transmission in the second example embodiment.

Figure 11:
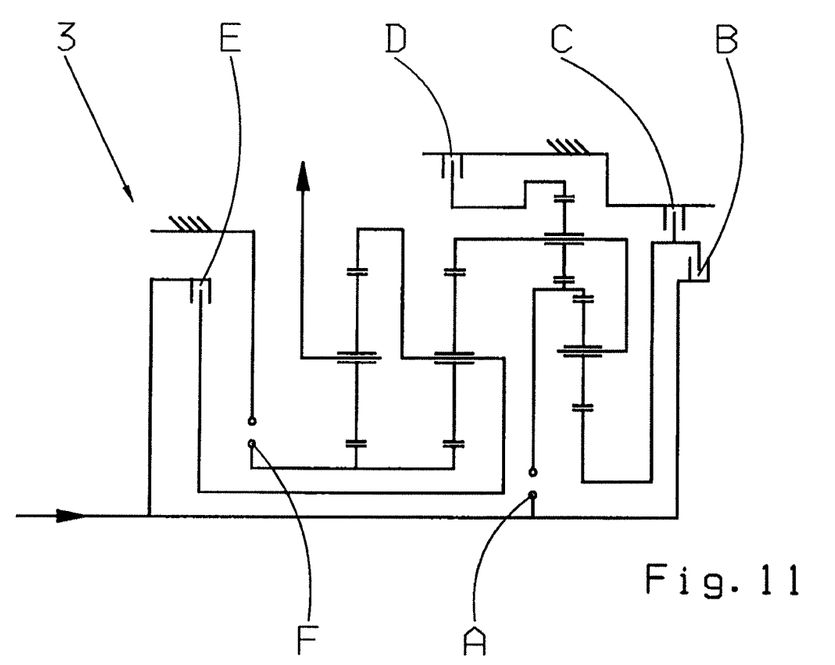
FIG. 11: A gear wheel layout of a third example embodiment of the transmission device according to the invention.
Figure 12:
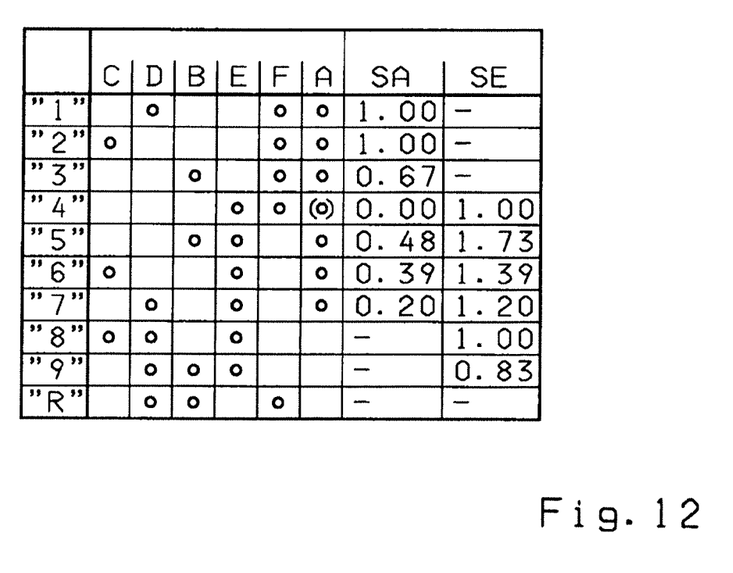
FIG. 12: A shifting scheme for the transmission device in FIG. 12.
Figure 13:
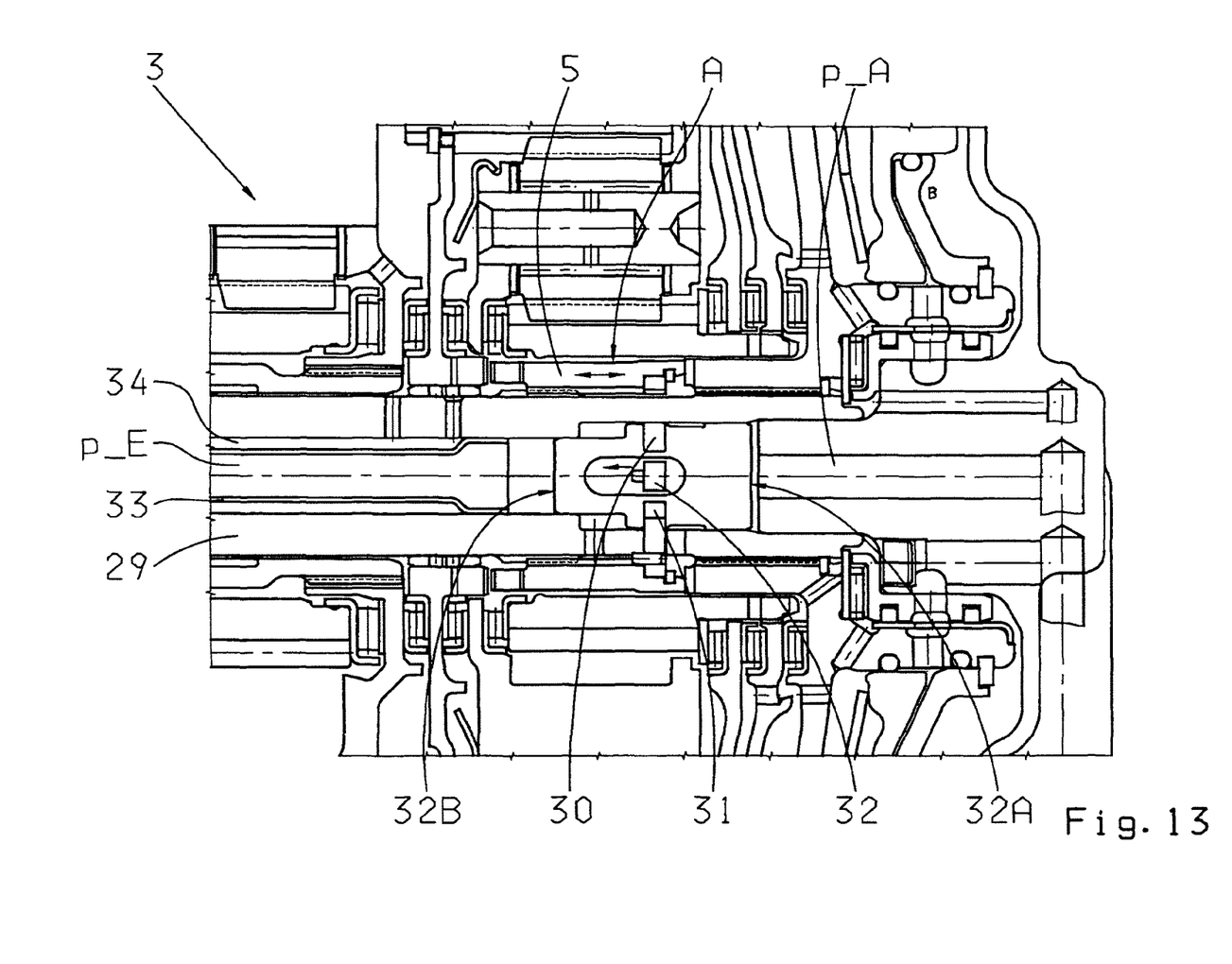
FIG. 13: A partial longitudinally sectioned view of the transmission device in FIG. 11 in the area of an interlocking shifting element.

FIG. 11 shows a gear wheel layout of a third example embodiment of a transmission device 3 according to the invention, in which the shifting elements A and F are each interlocking shifting elements whereas the shifting elements B, C, D and E are each frictional shifting elements. FIG. 12 shows a shifting logic scheme for this transmission device 3 of FIG. 11, such that in accordance with the actuation of the shifting elements A to F respectively, again nine gear ratio steps "1" to "9" for forward driving and one gear ratio step "R" for reversing can be obtained. From this shifting logic it can be seen that for this third example transmission embodiment too, controlling of the shifting elements A and E of the previously explained, first example embodiment can be used analogously. FIG. 13 shows a partial longitudinal section of a corresponding example design.

Figure 14:
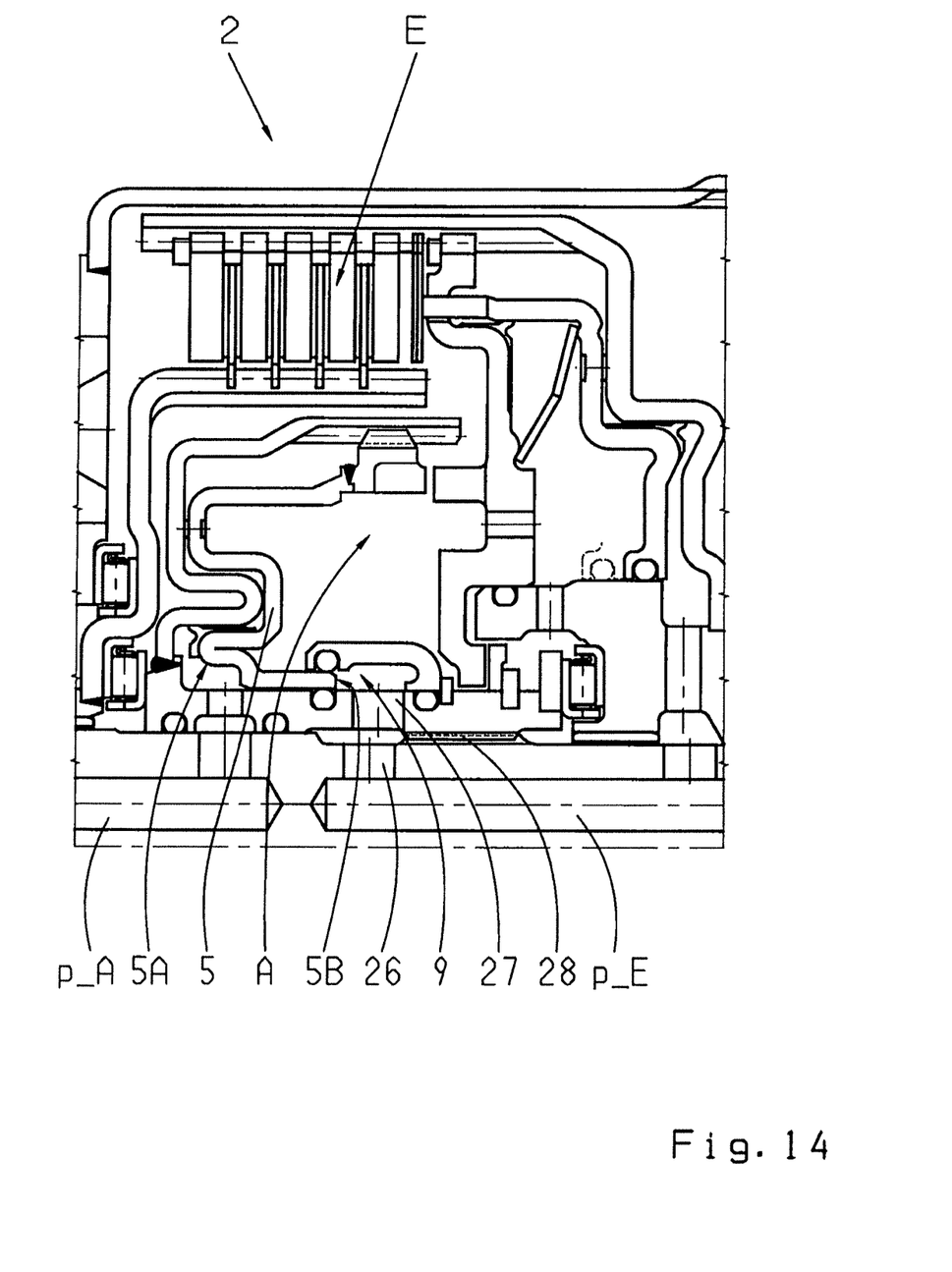
FIG. 14: A schematic, partial longitudinally sectioned view of a transmission device in the area of a shifting element.

In the manner represented in FIG. 14 the actuating piston 5 of the shifting element A is arranged to move longitudinally on a shaft 29 of the transmission device 1 in FIG. 12, and is functionally connected by carrier elements 30, 31 that pass through the shaft 29 to a differential piston 32 again arranged to move longitudinally in the shaft 29.

To close the shifting element A, the differential piston 32 is acted upon in the area of its larger, first functional surface 32A by the actuating pressure p_A of the shifting element A. While in the fourth to ninth gear ratio steps "4" to "9" the differential piston 32 is acted upon in the area of its smaller, second functional surface 32B by the actuating pressure p_E of the shifting element E, and an overall force component acting on the differential piston 32 is smaller compared with the overall force component that acts when in the first to third gear ratio steps "1" to "3".

In this case the area of the transmission device 1 carrying the actuating pressure p_E of the shifting element E is separated by a sleeve element 33 from an area 34 inside the shaft 29 which carries a lubricating pressure.

If the actuating pressure p_A of the shifting element A applied on the larger, first functional surface 32A decreases, the differential piston 32 is pushed by the actuating pressure p_E of the shifting element E to an extent such that the shifting element A is opened, this taking place when shifting from the seventh gear ratio step "7" to the eighth gear ratio step "8".

Finally, FIG. 14 shows another example of a design for an interlocking shifting element A which, viewed spatially, is arranged adjacent to a frictional shifting element E, the pressure control of these two shifting elements A, E having the same characteristics as the pressure control in the transmission device 1 of the first example embodiment according to the invention.

As can be seen in FIG. 14, the area of the transmission device 2 that carries the actuating pressure p_E of the shifting element E is connected via two bores 26 and 27 with the piston space 9 of the first shifting element A, and a carrier tooth array 28 is made with a fit that seals the connection between the piston space 9 of the shifting element A and the area connecting the actuating pressure p_E to one another. Alternatively, an O-ring or other sealing device can be provided before or after the carrier teeth to seal off to the necessary extent the hydraulic connection between the piston space 9 and the area of the transmission device 2 carrying the actuating pressure p_E.

In a further advantageous embodiment of the transmission device according to the invention, with appropriate shifting logic the two piston force levels desired for improving the shifting quality can be produced in an analogous manner by means of a so-termed addition piston, such that when the actuating piston is made as an addition piston the first shifting element has to be made with a restoring spring device for moving the first shifting element to its open operating condition.

By virtue of the procedure described above it is made possible, with little structural complexity, to improve the quality of shifting operations with support (factors) elements of different size in the various gear ratio steps to be engaged or disengaged.

INDEXES 1, 2, 3 Transmission device
4S Sun gear
4 Planetary gearset
5 Actuating piston
5A First functional surface
5B Second functional surface
6 to 8 Bore
9 Piston space
10 Restoring spring mechanism
11 Valve device
12 Piston element
12A, 12B End face
13 Blind-hole bore of the piston element
14, 15 Transverse bore
16 Sleeve
17, 18 Transverse bore
19 Disk packet
20 Hub
21 Electro-hydraulic transmission control unit
22 to 25 Valve device
26, 27 Bore
28 Carrier teeth
29 Shaft
30, 31 Carrier element
32 Differential piston
32A First functional surface
32B Second functional surface
33 Sleeve element
34 Lubrication pressure of guiding area

The invention claimed is:

1. A transmission device (1, 2, 3) comprising:
at least one electro-hydraulic transmission control unit (21) and a plurality of gear wheel pairs that are engaged and disengaged from a force flow by fluid actuated shifting elements (A-F) such that various gear ratios ("1"-"9", "R") are obtained;
each shifting element (A-F) being acted by, a first functional surface of an actuating piston of the respective shifting element (A-F), via a fluidic actuating pressure acting in an engaging direction of the respective shifting element (A-F); and
at least a first shifting element (A) and a second shifting element (E) being directly and functionally connected such that:
at least the actuating piston (5) of the first shifting element (A) being acted by a second functional surface (5B, 32B) of the actuating piston (5) of the first shifting element (A) via a fluidic actuating pressure (p_A; p_E) acting in a disengaging direction of the first shifting element (A),
a piston space (9) of the first shifting element (A), partially delimited by the second functional surface (5B, 32B) of the actuating piston (5) of the first shifting element (A), being separate from a piston space of the second shifting element (E), and
the piston space (9), partially delimited by the second functional surface (5B) of the actuating piston (5) of the first shifting element (A), being selectively connectable by a valve device (11) to either a pressurization area of the second shifting element (E), pressurized by the second actuating pressure (p_E), when the valve device (11) is in a first position, or a pressurization area of the first shifting element (A), pressurized by the first actuating pressure (p_A), when the valve device (11) is in a second position.

2. The transmission device according to claim 1, wherein the first shifting element (A) comprises a restoring spring mechanism (10) that acts on the actuating piston (5) of the first shifting element (A) in the disengaging direction of the first shifting element (A).

3. The transmission device according to claim 1, wherein to obtain a first gear ratio ("1") in which the actuating pressure (p_E) of the second shifting element (E) is essentially zero and a support factor (SA) is higher than in a second gear ratio ("4", "6") in which the actuating pressure (p_E) of the second shifting element (E) corresponds to an engaging pressure level of the second shifting element (E), the second functional surface (5B, 32B) of the actuating piston (5) of the first shifting element (A) is acted by an actuating pressure which is at essentially zero.

4. The transmission device according to claim 1, wherein the first functional surface (5A, 32A) of the actuating piston (5) of the first shifting element (A) is larger than the second functional surface (5B, 32B) of the actuating piston (5) of the first shifting element (A), and an area of the first shifting element (A) that carries the actuating pressure (p_A) is functionally connected with the piston space (9) partially delimited by the second functional surface (5B, 32B) of the actuating piston (5) of the first shifting element (A) by the valve device (11) that is actuated as a function of the actuating pressure (p_E) of the second shifting element (E).

5. The transmission device according to claim 4, wherein the valve device (11) is a changeover valve that is controlled, as a function of the actuating pressure (p_E) of the second shifting element (E), and the valve device (11) has a piston element (12) onto which the actuating pressure (p_A) of the first shifting element (A) and the actuating pressure of the second shifting element (E) is applied.

6. The transmission device according to claim 1, wherein the actuating piston (5) of the first shifting element (A) is arranged to move longitudinally on a shaft (29) and is functionally connected by at least one carrier element (30, 31) that passes through the shaft (29) to a differential piston (32) arranged to move longitudinally in the shaft (29), the differential piston (32) is acted upon by a functional surface (32A) by the actuating pressure (p_A) of the first shifting element (A) acting in the engaging direction of the first shifting element (A), and towards a further functional surface (32B) by the actuating pressure (p_E) of the second shifting element (E) acting on the differential piston (32) in the disengaging direction of the first shifting element (A).

7. A transmission device comprising:
at least one electro-hydraulic transmission control unit and with a plurality of gear wheel pairs that are engaged and disengaged from a force flow by fluid actuated shifting elements such that various gear ratios are obtained;
each shifting element being acted upon, in an area of a first functional surface of an actuating piston, with a fluidic actuating pressure acting in an engaging direction of the respective shifting element;
at least the first shifting element and a second shifting element being functionally connected such that at least an actuating piston of the first shifting element, as a function of an actuating pressure of the second shifting element, being acted upon in an area of a second functional surface by a fluidic actuating pressure acting in a disengaging direction of the first shifting element;
a piston space of the first shifting element, partially, delimited by the second functional surface of the actuating piston of the first shifting element, being separate from a piston space of the second shifting element partially delimited by the first functional surface of the actuating piston; and
either an area of the second shifting element, carrying an actuating pressure, or an area of the first shifting element, carrying an actuating pressure, being connectable to the piston space partially delimited by the second functional surface of the actuating piston of the first shifting element;
wherein the actuating pressure of the first shifting element is set by the transmission control unit essentially to zero, during emergency running operation, while the actuating pressure of the second shifting element is increased by the transmission control unit to a maximum system pressure.

8. The transmission device according to claim 1, wherein the first shifting element (A) is one of an interlocking shifting element and a frictional shifting element.

\* \* \* \* \*